Patented Dec. 21, 1926.

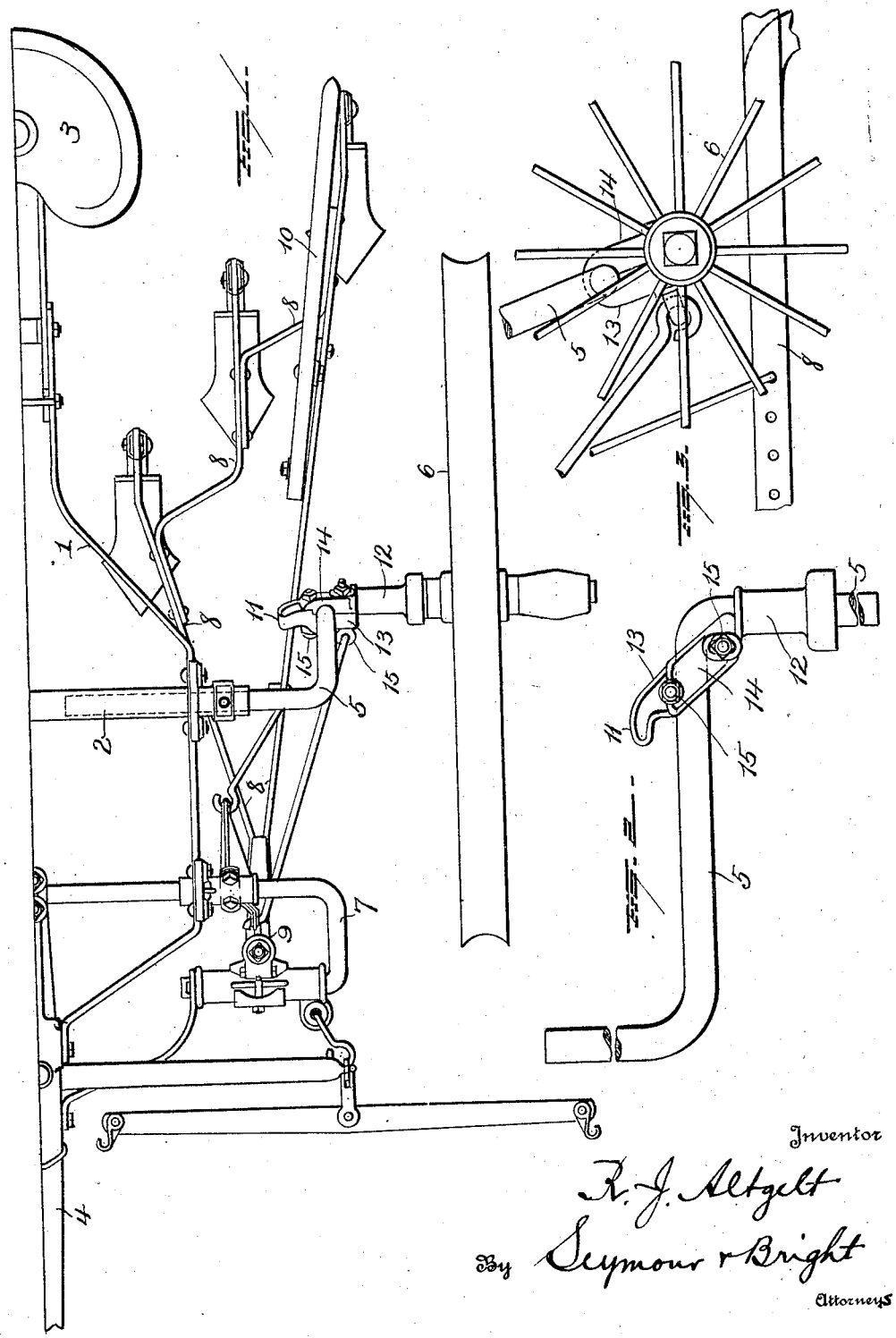

1,611,707

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

CULTIVATOR.

Original application filed May 13, 1922, Serial No. 560,702. Divided and this application filed December 19, 1924. Serial No. 756,980.

This invention relates to improvements in cultivators,—the same being a division of application filed by me on the 13th day of May, 1922, and designated by Serial No. 560,702.

The object of my present invention is to provide simple and efficient "hang-up" means for the gang frames of a wheeled cultivator.

With this object in view, the invention consists in certain novel features of construction and combinations of parts as hereinafter set forth and pointed out in the claim.

In the accompanying drawings—

Figure 1 is a view illustrating my improvements, and

Figures 2 and 3 are detail views.

The frame 1 of the cultivator may be mounted between its ends on a tubular cross bar 2, and at its rear end, said frame carries a seat 3, the forward end of the frame being secured to a pole casting 4. Crank-axle sections 5, 5 have mountings in the tubular cross bar 2 and the spindle portions of said crank axle sections enter the hubs of carrying wheels 6. A front arch 7 is connected with the frame 1 and with arms of this arch, the shovel or cultivator gang frames 8 are connected through the medium of suitable coupling devices 9 which will permit vertical as well as horizontal movements of the gang frames.

Under certain conditions it is desirable that one or both of the gang frames shall be raised and held in such position. In the present instance, the gang frames are provided with handles 10 so disposed at respective sides of the seat 3 as to be within reach of the rider, and to retain one or both of the gang frames in raised positions, hang-up hooks 11 are provided and located upon the axle sections, so as to be disposed at an angle to the spindle portions thereof.

A sand-band casting 12 is located upon the spindle portion of each axle section and in proximity to each casting 12 and preferably made as an integral part thereof, is a block 13 having a seat for the crank axle section. The blocks 13 are disposed approximately across the angles formed by the crank and spindle portions of the axle sections and blocks 14 are located opposite the blocks 13 and bolts 15 passing through said blocks securely clamp them to the axle sections. The blocks 13 project inwardly beyond the blocks 14 and are made hook shaped, and thus the hang-up hooks for the gang frames, on the axle sections.

If desired, one bolt hole in each block 13—14 may be elongated in order that the connection of the hang-up hooks with the axle sections may be adjusted.

Having fully described my invention what I claim as new and desire to secure by Letters-Patent, is:—

In a wheeled cultivator, the combination with vertically movable gang frames, a crank axle member having spindle portions, wheels on said spindle portions, and castings on said spindle portions forming sand bands and hang-up hooks, and means for clamping said combined hang-up hooks and sand bands to the axle members with the hooks disposed at an angle to the spindle portions of the crank axle members.

In testimony whereof, I have signed this specification.

RUDOLPH J. ALTGELT.